(No Model.)

B. C. SEATON.
VEHICLE RUNNING GEAR.

No. 291,542. Patented Jan. 8, 1884.

WITNESSES
J. L. Ourand
E. G. Siggers

B. C. Seaton
INVENTOR
by C. A. Snow & Co.
Attorneys

UNITED STATES PATENT OFFICE.

BENJAMIN COPLIN SEATON, OF COWAN, TENNESSEE.

VEHICLE RUNNING-GEAR.

SPECIFICATION forming part of Letters Patent No. 291,542, dated January 8, 1884.

Application filed August 4, 1883. (No model.)

*To all whom it may concern:*

Be it known that I, BENJAMIN C. SEATON, a citizen of the United States, residing at Cowan, in the county of Franklin and State of Tennessee, have invented a new and useful Running-Gear for Vehicles, of which the following is a specification, reference being had to the accompanying drawings.

The first branch of this invention, which relates to running-gear of wagons and other like vehicles, has for its object to arrange between the axle and the bolsters coiled springs, surrounding vertical bolts passed loosely through the axles, whereby space is economized.

The second branch of the invention has for its object to provide attachments for the ends of the front bolster, in combination with guide means attached to the upper surface of the front axle.

Figure 1:
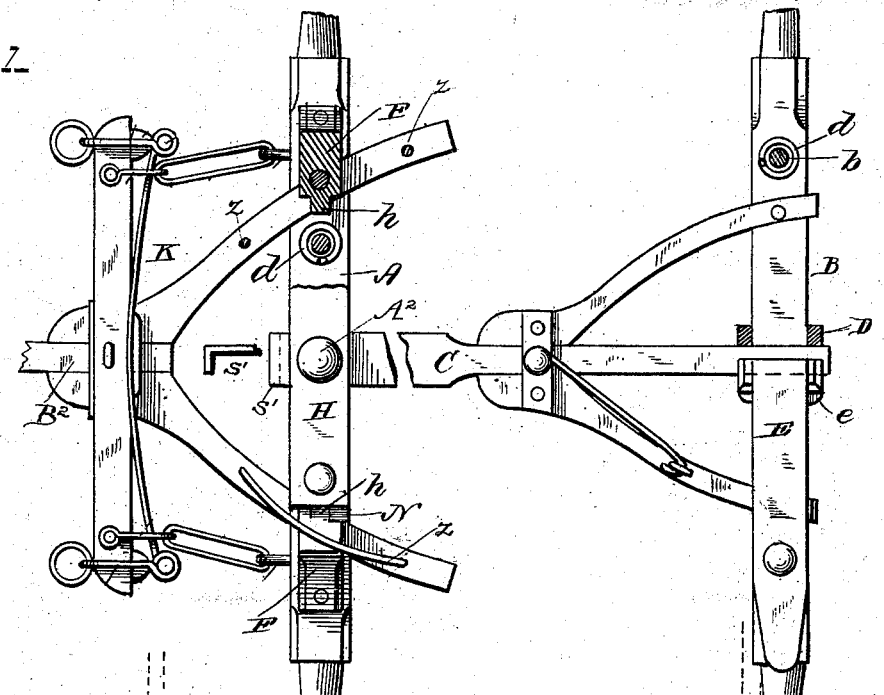
Figure 2:
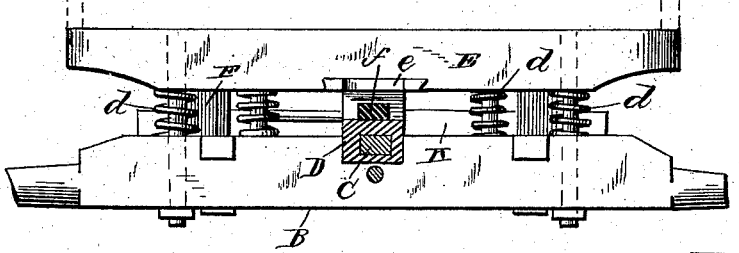
Figure 3:
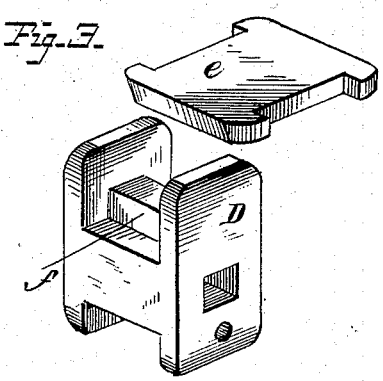
Figure 4:
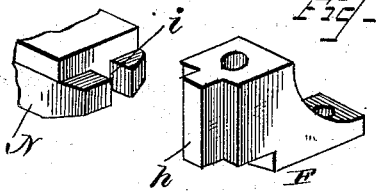

In the annexed drawings, Figure 1 is a plan view, a part being in section, of my improved running-gear. Fig. 2 is an end view, partially in section, of the rear axle and its bolster. Fig. 3 is a perspective view of a casting arranged between the rear axle and its bolster. Fig. 4 are views of the front-axle casting and its guiding means.

In the annexed drawings, A represents the front axle, and B the rear axle, which may be of any well-known construction. These axles are adjustably connected together by a reach, C. The rear axle, B, is provided about midway with an H-shaped casting, D, through the central portion of which is formed a longitudinal opening extending entirely through for the reception and passage of the rear end of the reach. Near the ends of this axle are formed vertical holes $b$, for the free passage of bolts attached to the bolster E, arranged above. These bolts of the bolster are surrounded by coiled springs or elastic cushions $d$, arranged between the axle and the bolster, for the purpose of properly separating the said axle and bolster. The middle portion of the bolster on the under side is provided with a notched plate, $e$, which passes over and between the upper portion of the casting D, attached to the upper surface of the rear axle, and it rests upon an elastic cushion, $f$, located in the said casting. The front end of the reach, which rests on a wear-plate, is provided with a downward lip or projection, $s'$, to limit the curved play of the axles in turning corners or other places. The gear is provided with the usual king-bolt, $A^2$, and tongue or pole $B^2$, as shown. The upper surfaces, near the ends, of the front axle are provided with castings F, each provided on its inner face with a vertical tongue, $h$, to engage with the end grooves, $i$, in the plates attached to the ends of the front bolster, thus constituting a guiding means for the vertical movement of the bolster. This front axle is also provided with three holes in the space between the end castings for the passage of the king-bolt and the end bolts attached to the bolster H. These bolts are also surrounded by coiled or elastic springs $d$, interposed between the axle and the bolster. The front and rear axles are provided with the usual hounds or braces. To the hounds of the front axle are secured braces $z$, passing over the castings F, to aid in retaining them in position for contact with the end tongue-plates, N, of the front bolster.

The castings herein described are secured to their respective axles by means of screws or their equivalents, and the bolts are attached to their respective bolsters by being passed downward until the heads rest within formed recesses, so as to be flush with the upper surfaces of the bolsters. The parts being properly attached and secured, the running-gear is organized for use substantially in the usual manner, as shown in Fig. 1 of the drawings.

The body of the vehicle, which is shown in dotted lines, Fig. 2, is secured to the rear bolster, E, and its front end is secured to the main bolster, (not shown,) which is arranged on the king-bolt $A^2$ just over the front bolster, H. Thus, in turning, the axle and the bolster H, which connects the reach to said axle, turn together on the king-bolt in the usual manner, while the body and the main bolster, to which it is secured at its front end, retain their relative positions.

I reserve the right to vary the construction and arrangement of parts without departing from the spirit of my invention.

What I claim as my invention, and desire to secure by Letters Patent, is—

1. The combination of the front axle having the castings secured on top at its ends and provided on their inner faces with a vertical tongue, the front bolster having the end plates provided with vertical grooves receiving said tongues, springs or cushions interposed between the axle and bolster, and the hounds passing under the castings on the axle and provided with the braces passing over said castings, substantially as and for the purpose set forth.

2. In running-gear, the combination, with the rear axle provided with a centrally-arranged casting formed with a longitudinal opening for the passage and reception of one end of a reach, and provided with a space and an elastic cushion for the reception of the bolster, substantially as and for the purpose set forth.

In testimony that I claim the foregoing as my own I have hereto affixed my signature in presence of two witnesses.

BENJAMIN COPLIN SEATON.

Witnesses:
R. F. OAKLEY,
DICK TAYLOR.